A. LIWENTAAL.
SELF PROPELLED VEHICLE.
APPLICATION FILED MAR. 6, 1908.
987,728.
Patented Mar. 28, 1911.
5 SHEETS—SHEET 1.
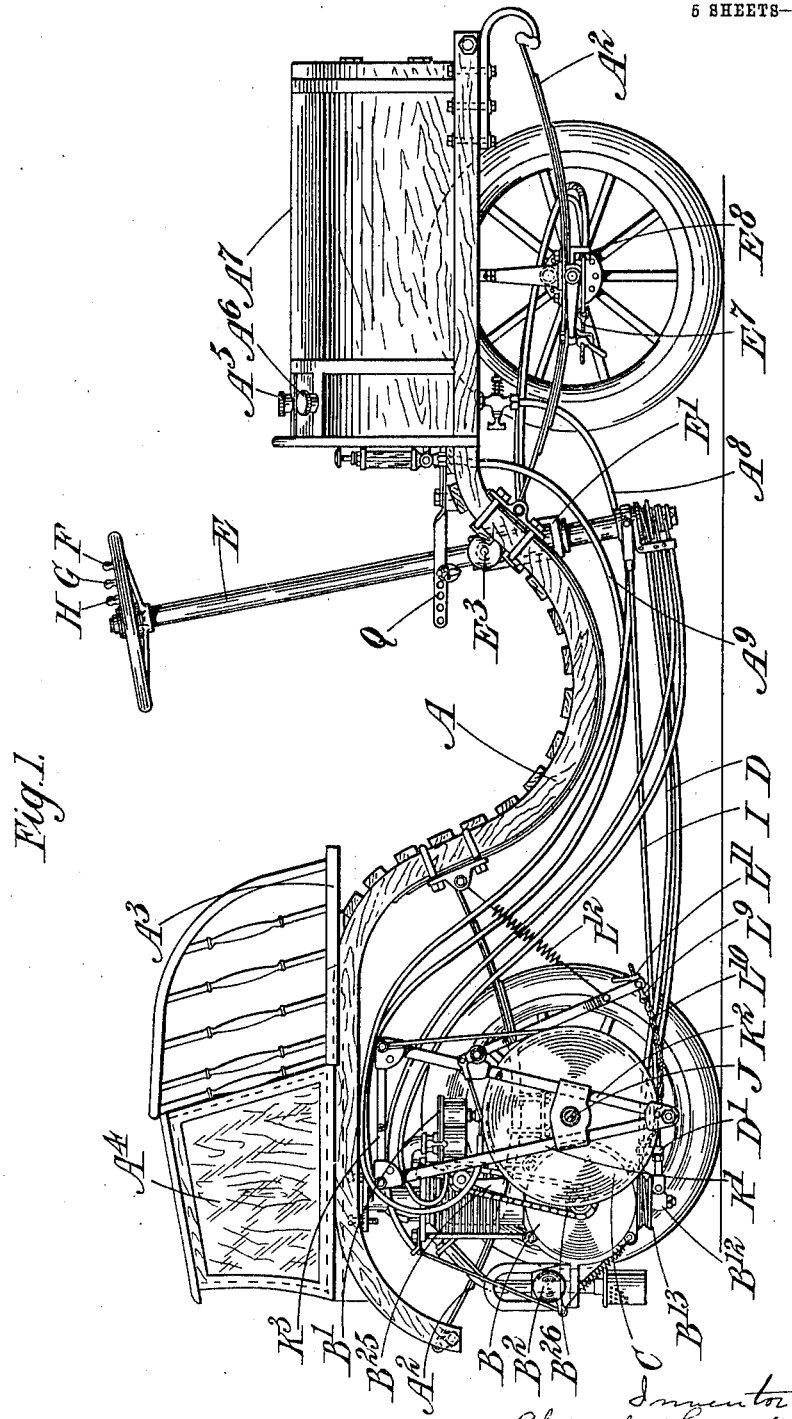

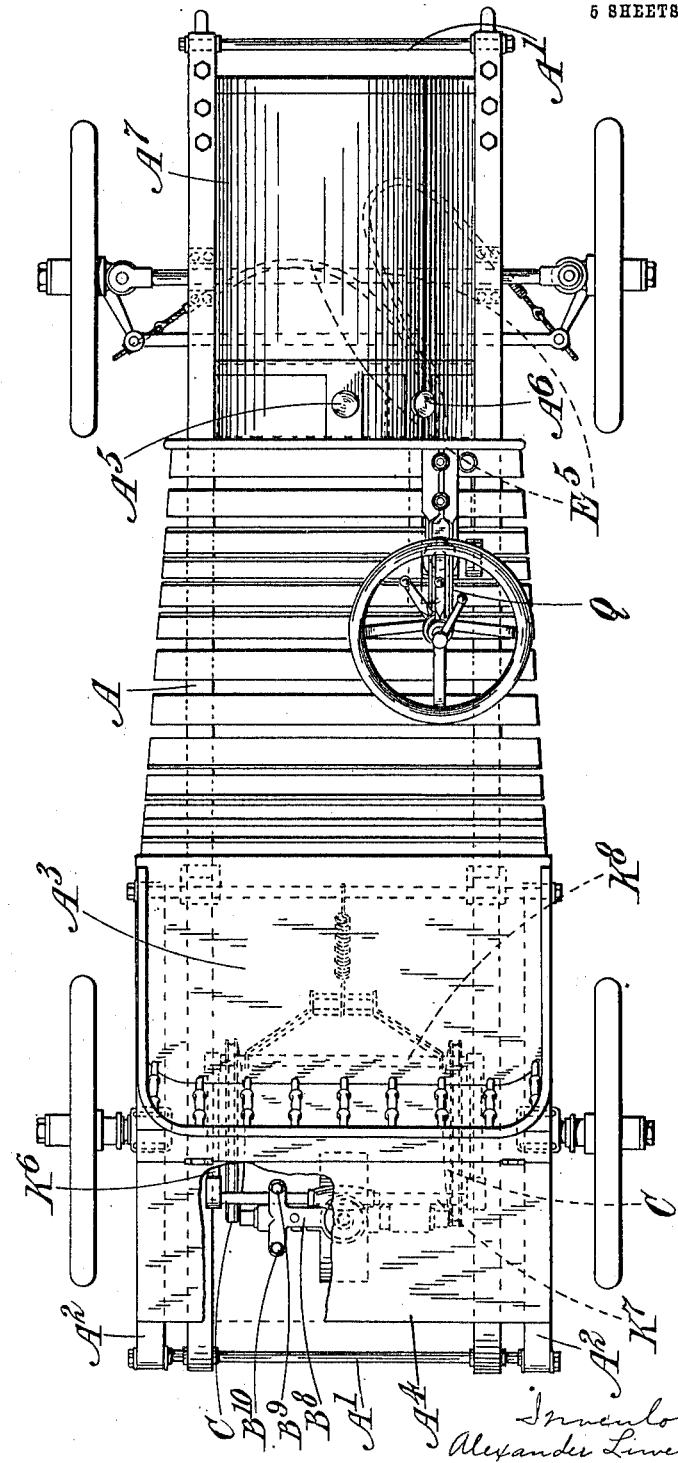

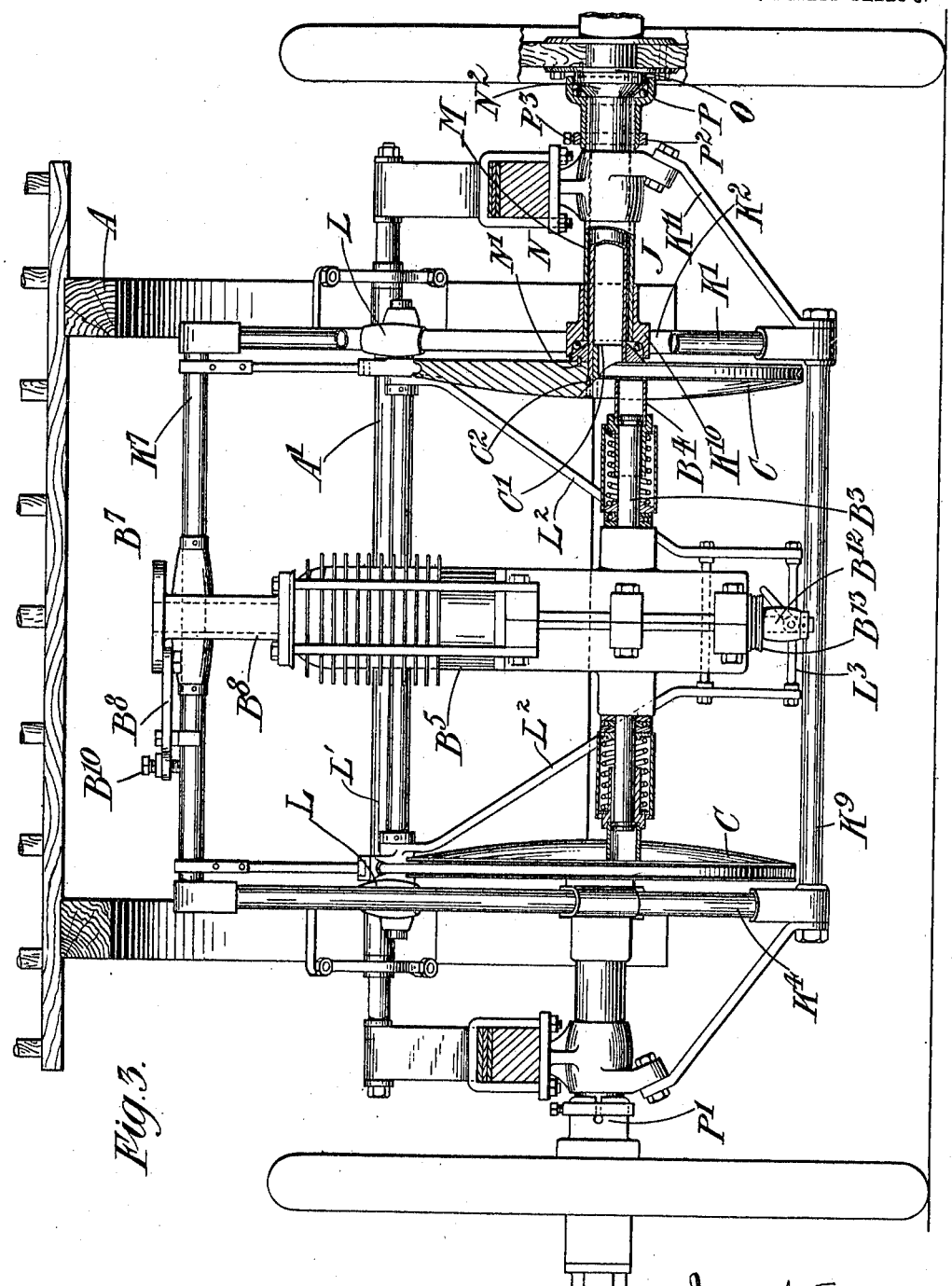

A. LIWENTAAL.
SELF PROPELLED VEHICLE.
APPLICATION FILED MAR. 6, 1908.
987,728.
Patented Mar. 28, 1911.
5 SHEETS—SHEET 4.
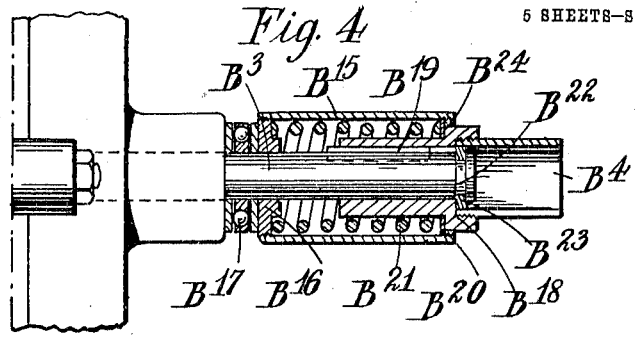
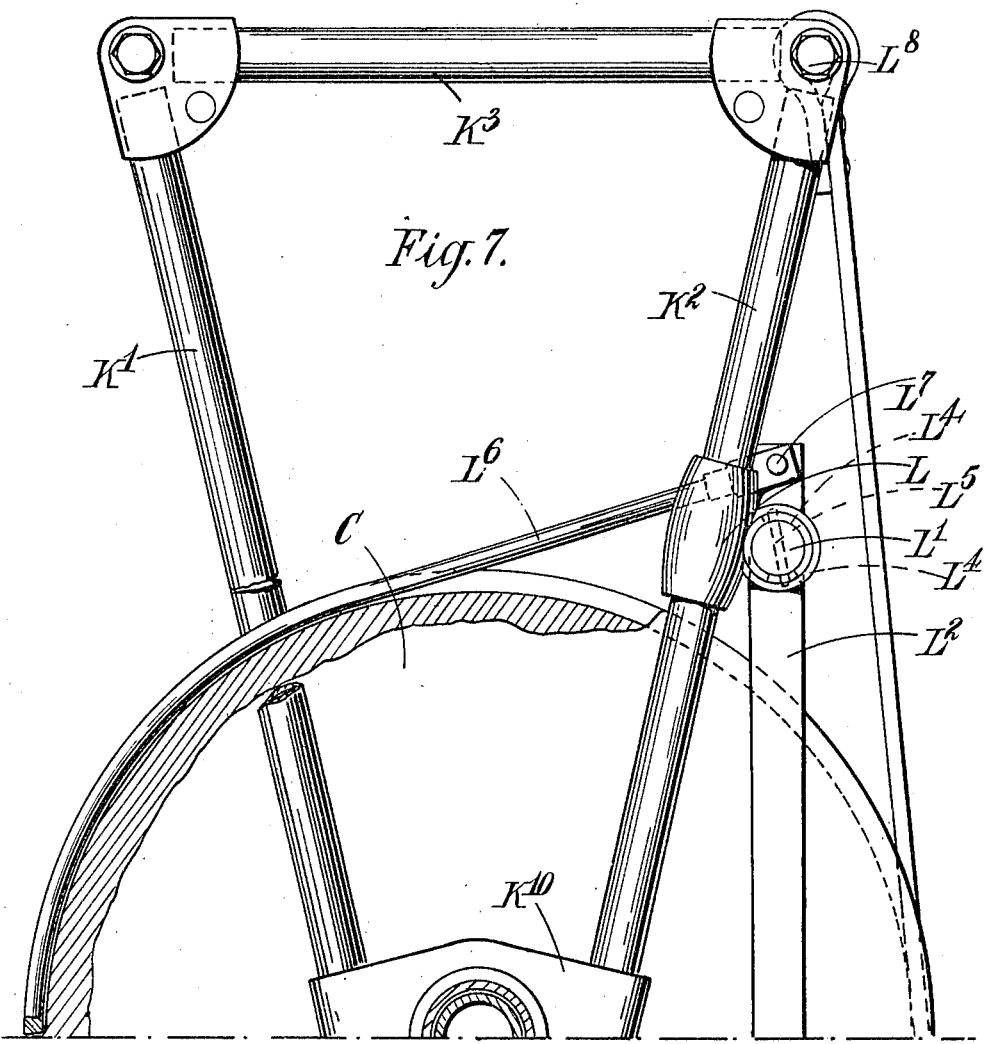

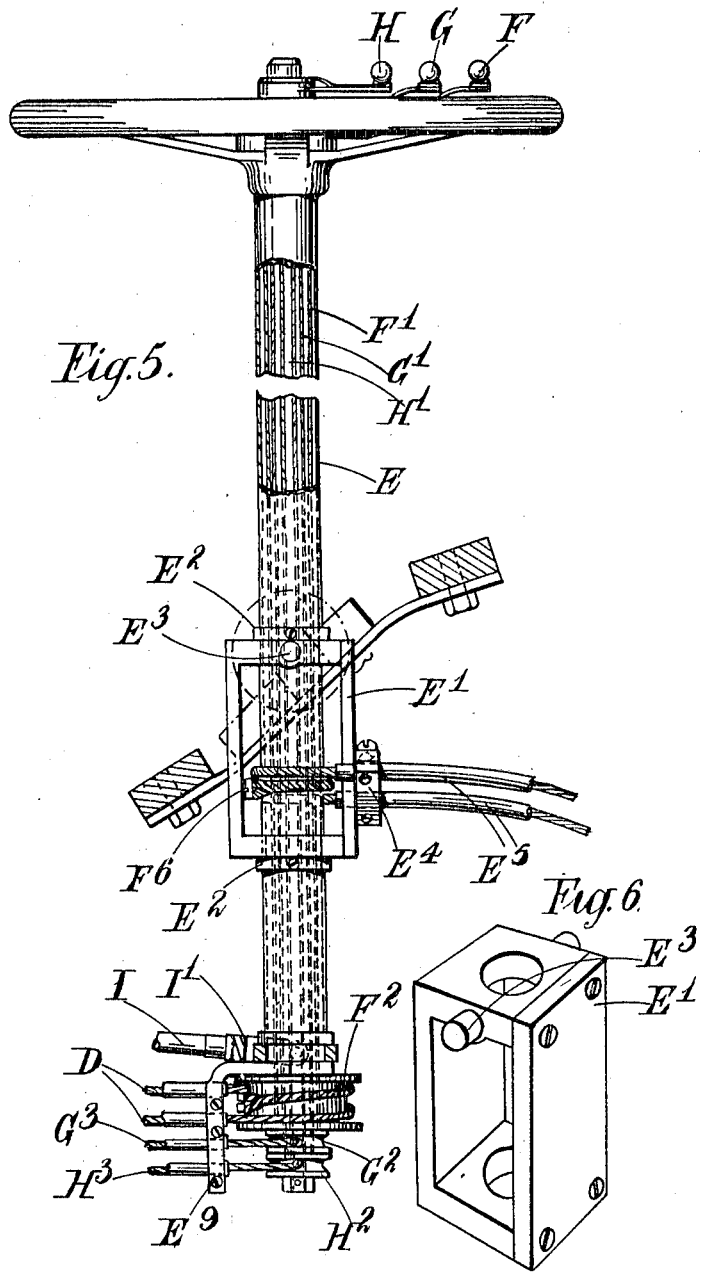

UNITED STATES PATENT OFFICE.

ALEXANDER LIWENTAAL, OF LONDON, ENGLAND, ASSIGNOR TO HUMPHERY AND LIWENTAAL LIMITED, OF LONDON, ENGLAND.

SELF-PROPELLED VEHICLE.

987,728.  Specification of Letters Patent.  Patented Mar. 28, 1911.

Application filed March 6, 1908. Serial No. 419,524.

*To all whom it may concern:*

Be it known that I, ALEXANDER LIWENTAAL, a citizen of the Confederation of Switzerland, residing at London, in England, have invented certain new and useful Improvements in Self-Propelled Vehicles, of which the following is a specification.

This invention relates to self-propelled vehicles the special feature of the design being to obviate many of the heavy and expensive appliances and complications now commonly to be found on such vehicles.

One feature of this invention is the arrangement of one member of a friction gear on a wheel or wheel-axle and the other member of the friction gear on the main shaft of the motor, or a flexible or other part attached thereto, there being provision for relative movement between the two members of the friction gear so that engagement may take place at different distances from the axis of the wheel for the purpose of varying the speed of driving.

Another feature of this invention is the arrangement of a steering column to act as a lever for controlling the brake or other operative mechanism of the vehicle.

Other features of this invention will be evident from the following description taken in connection with the accompanying drawings, in which:—

Figure 1 is a side elevation of a self-propelled vehicle constructed according to one modification of this invention, the wheels on the right hand side of the vehicle being removed; Fig. 2 is a plan of the same; Fig. 3 is a rear end elevation partly in section; Fig. 4 is a detail; Fig. 5 is an elevation, partly in section, of the steering column; Fig. 6 is a detail of the same; Fig. 7 is an enlarged view of part of the brake mechanism.

Like letters indicate like parts throughout the drawings.

Referring more particularly to Figs. 1 to 3, the general arrangement and construction of the vehicle will first be described.

The frame of the vehicle consists of two side members A of wood, bent as shown and connected together by metal tie-rods $A^1$. By employing wooden members A curved in the middle as shown, great flexibility of the frame of the vehicle is obtained and the effect of road shocks overcome to a large extent. The side members A are mounted on springs $A^2$ and rest on fittings surrounding the wheel axles. The seat $A^3$ is attached to the frame and behind this seat is arranged a box $A^4$ which may be used for storage purposes. In the front of the vehicle next to the dash-board, two tanks $A^5$ and $A^6$ are arranged for carrying petrol or other liquid fuel and lubricating oil respectively. The tanks $A^5$ and $A^6$ are within a wooden casing, the continuation of this casing forming a box $A^7$ which may be used for storage purposes. The box $A^7$ is provided with a door in the front of the vehicle.

The driving engine B is preferably of a type such as is commonly used on motor-cycles and is suspended in a frame-work carried on the rear wheel axles. The driving engine B is provided with a suitable carbureter $B^1$ and an ignition device such as the magneto $B^2$. The liquid fuel and lubricating oil are brought from the tanks $A^5$ and $A^6$ to the engine by flexible pipes $A^8$ and $A^9$. Attached to the rear wheel axles J, which are rotatable with the wheel, are disks C having spherical or conical surfaces on one side, the spherical or conical surfaces being turned toward the engine. The crank-shaft $B^3$ of the engine is extended on each side and the ends are provided with cylinders $B^4$ of steel. The cylinders $B^4$ can be caused to engage with the disks C and thereby drive the vehicle. The engine B is suspended so as to be movable in a plane situated midway between the disks C so that the speed of the vehicle can be varied by altering the position of the engine and therewith the cylinders $B^4$ relatively to the centers of the disks C. For reversing the direction of motion of the vehicle, the engine is arranged so that it can be rotated through 180° about the axis of the cylinder, thus changing the direction of rotation of the cylinders $B^4$ with respect to the disks C. The rotation of the engine is effected by Bowden wires D connected to a cylinder within the steering column E and operated by a lever F.

Levers G and H are provided on the steering wheel for operating through the Bowden wires the ignition and throttle valve.

The steering column E is mounted within a fitting which is provided with trunnions supported in suitable bearings so that the steering column with the fitting is movable in a plane parallel to that of the view shown in Fig. 1 and it is connected by a tie-rod I to the engine so that the movement of the engine for the purpose of varying the speed, as referred to above, can be effected by the driver moving the steering wheel toward or away from himself.

Brake bands are provided in grooves in the peripheries of the disks C and mechanism is so arranged that, when the steering column E is forced as far as possible forward, the brake is brought into operation, the cylinders $B^4$ on the crank shaft of the engine being out of engagement with the disks C. As the steering wheel is moved toward the driver the brake is thrust out of operation and the engine can run freely. As the steering column is moved still nearer to the driver, the cylinders $B^4$ which are slidable on the crank-shaft $B^3$ under the action of springs $B^{21}$ tending to press them outwardly, are brought into engagement with the disks C and the engine drives the vehicle first at its lowest speed, the speed increasing as the steering wheel gets nearer and nearer to the driver and the cylinders $B^4$ nearer and nearer to the axes of the disks C.

The driving mechanism and other parts of the vehicle will now be more fully described.

The engine is carried in a frame made up of tubes $K^1 \ldots K^9$, the whole frame being supported on sleeves $K^{10}$ carried on tubes surrounding the axles J of the wheels and by tie-bars $K^{11}$ connecting the bottom of the frame to the fittings surrounding the axles J into which the springs of the vehicle are attached. The engine casing $B^5$ has attached to it a tubular member $B^6$ which is rotatable in a fitting $B^7$. The fitting $B^7$ is rotatable itself on the tube $K^7$ of the frame which supports the engine. Attached to a flange on the top of the tubular member $B^6$ is a T-piece $B^8$ having, passing through the ends of two of its arms, screws $B^9$ and $B^{10}$. The screw $B^9$ when the engine is in the position shown in the drawings just catches over the tube $K^7$ thereby holding the engine in position. The T-piece $B^8$ is sufficiently flexible to allow the arms carrying the screws $B^9$ and $B^{10}$ to bend enough to allow the screws $B^9$ and $B^{10}$ to be pulled over the tube $K^7$ so that, on reversing the direction of driving, the screw $B^{10}$ catches over the tube $K^7$ on the other side of the vehicle and locks the engine in the new position. As just mentioned, the T-piece $B^8$ is sufficiently flexible to permit the screws $B^9$ and $B^{10}$ to pass over the tube $K^7$, but it is sufficiently stiff to hold the engine in position under ordinary circumstances.

Attached to the bottom of the engine casing $B^5$ is a fixed rod or spindle $B^{11}$. This spindle passes through a fitting $B^{12}$ and is provided with a nut at its end. A pulley $B^{13}$ is fixed on the spindle $B^{11}$, this pulley being connected to the Bowden wire D by means of which the engine is rotated for reversing the direction of driving. The wire of the Bowden wire D is wrapped around the pulley $B^{13}$, the outer tubes of the two parts of the Bowden wire D being attached to a fitting $D^1$ clamped on the tie-rod I. The tie-rod I used for moving the engine, is attached to the fitting $B^{12}$, as shown in Fig. 1. Before reversing the engine, it is preferably moved to the free position, that is to say a position in which the cylinders $B^4$ are clear of the disks C.

The cylinders $B^4$, which engage with the disks C, are held in position by arrangements now to be described.

Referring more particularly to Fig. 4 which shows the arrangement for holding one of the cylinders, on an enlarged scale, the crank shaft $B^3$ extends within a cylinder or sleeve $B^{15}$. The cylinder $B^{15}$ is closed at the end adjacent to the engine by a plate $B^{16}$, and a ball bearing $B^{17}$ is provided between this plate and the crank casing. The cylinder $B^4$ is screwed within a cylindrical member $B^{18}$ which surrounds the shaft $B^3$. A key $B^{19}$ fits into a slot in the shaft $B^3$ of the cylindrical member $B^{18}$ causing the two to rotate together. A washer $B^{20}$ surrounds the member $B^{18}$ and a spiral spring $B^{21}$ is arranged between this washer and the plate $B^{16}$ which closes the other end of the cylinder $B^{15}$. A cylinder $B^{22}$ having an enlarged head, screws into the end of the crank shaft $B^3$, and a ring $B^{23}$ surrounds this cylinder thus preventing the withdrawal of the member $B^{18}$ from the cylinder $B^{15}$. The space between the enlarged end of the cylinder $B^{18}$ and the cylinder $B^{15}$ is closed by a ring $B^{24}$ screwing into the cylinder $B^{15}$. With this arrangement of parts the cylinders $B^4$ are pressed with the required pressure against the disks C, the back thrust of the springs being on the plates $B^{16}$, while at the same time the cylinders $B^4$ can be easily removed and replaced by new ones when they become worn.

Attached to the tube $K^2$ and its parallel mate of the frame which supports the engine are two members L which form bearings for a spindle $L^1$ to which are fixed levers $L^2$, these levers being joined together at the bottom by rods $L^3$. Within the bearing portion of the member L on the tube $K^2$, two slots $L^4$ (Fig. 7) are cut. A pin $L^5$ is fixed in the spindle $L^1$, the ends of the pin projecting into the two slots $L^4$. By this means the extent of movement of the lever $L^2$ is limited. In the periphery of each of the disks C a groove is cut. Rods $L^6$ lie in these grooves. Each of the rods $L^6$ is attached at one end to a pin $L^7$ in the end of the corresponding lever $L^2$, the other ends of the rods $L^6$ being attached to pins $L^8$ at the top of the frame-work supporting the engine. By moving the levers $L^2$, the rods $L^6$ can be pressed into the grooves in the peripheries of the disks C thereby braking the movement of the latter. Upon the lower of the rods $L^3$ which connect the two levers $L^2$ a fitting is arranged into which is screwed a screw $L^9$, this screw being provided with a suitable eye for the attachment of a chain $L^{10}$ such as is commonly used on a bicycle, the other end of this chain being connected to the member $D^1$ on the rod I. The screw $L^9$ is provided with a nut $L^{11}$ having a handle for the purpose of adjustment. By this means, as hereinbefore referred to, when the driver pushes the steering wheel as far forward as possible, the rod I pushes the lower portion of the engine back and thus puts the bicycle chain $L^{10}$ in tension thereby applying the brake. The brake is normally kept out of operation by a spring $L^{12}$.

The steering column E consists of a tube provided at the top with a suitable steering wheel or handle. The steering column E is mounted in a frame-work $E^1$ (shown on an enlarged scale in Fig. 6). It is prevented from endwise movement in the frame $E^1$ by collars $E^2$ fastened to it. The frame $E^1$ is provided with trunnions $E^3$ which are mounted in suitable bearings at the top of the vehicle, thus permitting the steering column to be moved forward or backward for the purpose of varying the speed of the engine or applying the brakes. The fitting $E^4$ (not shown in Fig. 6) is attached to the frame $E^1$ for the purpose of supporting the outer tube of a Bowden wire $E^5$. The inner wire of the Bowden wire is coiled around the steering column E and fixed thereto by a screw $E^6$. The Bowden wires are led to the two sides of the Ackermann gear, the inner wires being attached to screws $E^7$ with adjusting nuts. The outer tubes of the Bowden wire are held on fittings $E^8$ attached to the springs. By connecting the Bowden wire to both sides of the Ackermann gear, the advantage is of course obtained that, should one portion of the Bowden wire break, the vehicle can still be steered.

Within the steering column E is arranged a rotatable tube $F^1$ connected to the operating handle F hereinbefore referred to as being employed for rotating the engine. The tube $F^1$ projects at its lower end beyond the steering column E and has attached thereto a pulley $F^2$. Coiled around this pulley is an inner wire of the Bowden wire D which is employed for reversing the direction of driving as described above. The outer tube of the Bowden wire is held on a member $E^9$ attached to the steering column E. Within the tube $F^1$ is another tube $G^1$ attached to the handle G which is employed for controlling the ignition. The tube $G^1$ projects at its lower end beyond the tube $F^1$ and has attached to it a pulley $G^2$. The inner wire of a Bowden wire $G^3$ is attached to the pulley $G^2$ the outer tube of this Bowden wire being held on the fitting $E^9$. The Bowden wire $G^3$ is led to the magneto $B^2$, the outer tube of the Bowden wire at this end being held on any suitable fitting. Within the tube $G^1$ is a tube $H^1$ attached to the handle H which is used to control the throttling of the engine. The tube $H^1$ projects at its lower end beyond the tube $G^1$ and has a pulley $H^2$ attached to it. The Bowden wire $H^3$ leading from the engine has its inner wire attached to the pulley $H^2$ and the outer tube attached to the fitting $E^9$. The Bowden wire $H^3$ is led to the engine and controls the throttling in any desired manner.

By providing the fitting $E^9$ on the steering column E for supporting the outer tubes of the Bowden wires D, $G^3$ and $H^3$, the steering column can be moved forward or backward to vary the speed or apply the brakes to the engine, or it can be rotated for steering purposes without in any way varying the position of the wires within the outer tubes of the Bowden wires just referred to.

The connecting rod I is provided with a forked end $I^1$ which is pivoted to a collar on the steering column E.

"Auto-locking" devices are provided for the steering column and the levers F, G and H and also for the trunnions $E^3$ about which the steering column is moved.

A fan $B^{25}$ may be arranged at the side of the engine for cooling purposes, this fan $B^{25}$ being driven by means of a bicycle chain $B^{26}$ from the crank shaft of the engine.

The disks C are attached to the axles J in the following manner:—Each axle J (Fig. 3) is hollow and fits into a hole in the center of the corresponding disk C and is firmly fixed therein by forcing the cylinder $C^1$ within the axle J, and also by means of a set screw $C^2$. The axle J is surrounded by a fixed tube or cylinder M. This cylinder M screws into a sleeve or fitting $K^{10}$ held on the frame-work $K^1$ . . . $K^9$ which supports the engine. The fitting $K^{10}$ has a cup portion of a ball-bearing formed therein. The cone portion N of the bearing is a separate piece from the disk C and is provided with pins $N^1$ which fit into suitable holes in the flat surface of the disk C. Adjacent to the wheel, another ball-bearing is arranged. The cone portion $N^2$ of this bearing is exactly similar to the cone portion adjacent to the disk C. The pins in this case fit into suitable holes in the flanged plate O on the wheel. The cup portion of each of these outer bearings consists of a cylindrical member P screwing onto the cylinder M. The member P is provided with longitudinal slots $P^1$ (as shown on the left-hand side of Fig. 3) and a clamping ring $P^2$ provided with a tightening screw $P^3$ surrounds it.

After the bearing has been properly adjusted, it is only necessary to tighten up the screw P³ so as to keep the member P firmly in position.

For the purpose of limiting the maximum speed at which the vehicle can be driven, a device is arranged to prevent the steering column E being moved beyond any desired position toward the driver. For this purpose an arm Q having a number of holes therein is attached to the top of the car and a pin is arranged to enter into any one of these holes and be locked therein by means, for example, of a padlock.

Various modifications may obviously be made in the method of carrying the invention into effect, for example, the reversing of the direction of movement of the vehicle might be effected by traversing the engine crank-shaft beyond the center of the disks C so as to engage therewith upon the opposite side of the axles. Instead of employing springs to press the cylinders B⁴ against the disks C, the cylinders B⁴ might be rigidly fixed to the crank-shaft and springs provided to push or pull the disks C against the cylinders B⁴, the disks C for this purpose being arranged to be axially movable. Two motors each having any desired number of cylinders can be used to operate together on the disks or one on each of the disks. If desired, a lever separate from the steering column can be employed for moving the engine for varying the speed or applying the brakes. The necessary speed variation may, if desired, be obtained by controlling the operation of the carbureter, the engine in this case remaining fixed in position. Instead of friction driving mechanism, as described, each of the disks C might be replaced by a disk having, projecting from one of its faces, a number of cylindrical surfaces with concentric corrugations adapted to be engaged by a cylinder corrugated in a similar manner and connected to the crank-shaft of the engine. The speed variation in this case would be obtained by causing the corrugated cylinders connected with the crank-shaft to engage with either the inner or outer surfaces of the various concentric cylinders on the driven members which replace the disks C. In place of an engine such as described, any other suitable type of motor might be employed, for example an electric motor. It is obvious that various other modifications may be made.

What I claim as my invention and desire to secure by Letters Patent is:—

1. In a self-propelled vehicle, the combination of a motor, a friction gear one member of which is mounted on a wheel of the vehicle the other member being mounted on the main shaft of the motor the axes of these two members being parallel to one another, means for producing a relative movement between said members of the friction gear so that engagement may take place at different distances from the axis of the vehicle wheel for the purpose of varying the speed of driving.

2. In a self-propelled vehicle, the combination of a motor, a friction gear one member of which is mounted on a wheel of the vehicle the other member being mounted on the main shaft of the motor the axes of these two members being parallel to one another, means for producing a relative movement between said members of the friction gear so that engagement may take place at different distances from the axis of the vehicle wheel for the purpose of varying the speed of driving, and a lever for operating said means.

3. In a self-propelled vehicle, the combination of a motor, a friction gear comprising a disk with a spherical surface connected to a wheel of the vehicle and a cylinder attached to the main shaft of the motor and adapted to frictionally engage said disk, means for moving the motor so that engagement may take place between the two members of the friction gear at different distances from the axis of the vehicle wheel for the purpose of varying the speed of driving, and a lever for operating said means.

4. In a self-propelled vehicle, the combination of a motor mounted on an axis about which it can swing, a friction gear comprising a disk with a spherical surface attached to a wheel on the vehicle and a cylinder attached to the main shaft of the motor and adapted to frictionally engage said disk, means for swinging the motor about its axis so that engagement may take place between the two members of the friction gear at different distances from the axis of the vehicle wheel for the purpose of varying the speed of driving, said means for producing this relative movement being operated by the steering post which is mounted to act as a lever.

5. In a self-propelled vehicle, the combination of a motor, a friction gear comprising a disk with a spherical surface attached to one of the wheels of the vehicle and a cylinder attached to the main shaft of the motor and adapted to frictionally engage said disk, the axis of the cylinder being parallel or approximately so with that of the disk, and a spring adapted to press said cylinder and said disk together.

6. In a self-propelled vehicle the combination of a motor, a friction gear comprising a disk with a spherical surface attached to one of the wheels of the vehicle and a cylinder attached to the main shaft of the motor and adapted to frictionally engage said disk, and a spring adapted to press the said cylinder against said disk.

7. In a self-propelled vehicle, the combination of a motor, a friction gear one member of which is mounted on a wheel of the vehicle, the other member being mounted on the main shaft of the motor, means for rotating the shaft of the motor end for end for the purpose of reversing the direction in which the vehicle is being driven.

8. In a self-propelled vehicle, the combination of a motor, a friction gear one member of which is mounted on a wheel of the vehicle the other member being mounted on the main shaft of the motor, and means for rotating the shaft of the motor end for end for the purpose of reversing the direction in which the vehicle is being driven, comprising a Bowden wire attached to and operated by a rotatable cylinder situated within the steering post.

9. In a self-propelled vehicle, the combination of a motor, a friction gear comprising a disk attached to a wheel of the vehicle, the other member of the friction gear being mounted on the main shaft of the motor the axes of the two members of the friction gear being parallel to one another, means for producing a relative movement between said members of the friction gear so that engagement may take place at different distances from the axis of the vehicle wheel for the purpose of varying the speed of driving, a bearing on the periphery of the driven member of the friction gear, a brake band engaging therein and adapted to operate on said disk and a lever for operating the means for varying the movement of one of the friction members and applying the brake band to the periphery of one of the friction disks.

10. In a self-propelled vehicle, the combination of a motor, a friction gear comprising a disk attached to a wheel of the vehicle, the other member of the friction gear being mounted on the main shaft of the motor the axes of the two members of the friction gear being parallel to one another, a brake band adapted to operate on said disk, means for producing a relative movement between said members of the friction gear so that engagement may take place at different distances from the axis of the vehicle wheel for the purpose of varying the speed of driving comprising a steering post mounted so as to act as a lever for moving the motor both to vary the speed and to apply the brake-band.

11. In a self-propelled vehicle, the combination of a motor, a friction gear comprising a disk attached to a wheel of the vehicle, the other member of the friction gear being mounted on the main shaft of the motor the axes of the two members of the friction gear being parallel to one another, means for producing a relative movement between said members of the friction gear so that engagement may take place at different distances from the axis of the vehicle wheel for the purpose of varying the speed of driving, a brake-band adapted to operate on said disk, a lever for operating the means for varying the speed of driving and applying the brake-band, a frame adjacent to said lever, and a movable stop adapted to be placed and locked in certain positions on said frame for the purpose of limiting the movement of said lever thereby limiting the maximum speed at which the vehicle can be driven.

In testimony whereof I have signed my name to this specification in the presence of two subscribing witnesses.

ALEXANDER LIWENTAAL.

Witnesses:
L. H. MUNIER,
Z. VULLIER.

---

Copies of this patent may be obtained for five cents each, by addressing the "Commissioner of Patents, Washington, D. C."